US012683897B2

(12) United States Patent
DeDona et al.

(10) Patent No.: US 12,683,897 B2
(45) Date of Patent: Jul. 14, 2026

(54) LOAD BALANCING USING A QUALITY OF SERVICE POLICY

(71) Applicant: INTERNATIONAL BUSINESS MACHINES CORPORATION, Armonk, NY (US)

(72) Inventors: Salvatore Pasquale DeDona, Cortlandt Manor, NY (US); Hubertus Franke, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 18/767,296

(22) Filed: Jul. 9, 2024

(65) Prior Publication Data

US 2026/0019366 A1 Jan. 15, 2026

(51) Int. Cl.
*H04L 47/125* (2022.01)
*H04L 47/70* (2022.01)
*H04L 47/80* (2022.01)

(52) U.S. Cl.
CPC .......... *H04L 47/125* (2013.01); *H04L 47/805* (2013.01); *H04L 47/826* (2013.01)

(58) Field of Classification Search
CPC .... H04L 47/125; H04L 47/805; H04L 47/826
USPC ........................................ 709/226
See application file for complete search history.

(56) References Cited

U.S. PATENT DOCUMENTS

| | | | |
|---|---|---|---|
| 7,720,990 B2 | 5/2010 | Shen | |
| 7,987,268 B2 * | 7/2011 | Chen | H04L 67/1001 |
| | | | 709/219 |

| | | | |
|---|---|---|---|
| 8,982,709 B2 | 3/2015 | Sharma | |
| 9,020,829 B2 | 4/2015 | Li | |
| 9,325,585 B1 * | 4/2016 | Wang | H04L 41/5025 |
| 9,600,332 B2 | 3/2017 | Patel | |
| 11,032,210 B2 | 6/2021 | Hariharan | |
| 11,570,113 B2 * | 1/2023 | Kalman | H04L 41/40 |
| 2011/0060627 A1 | 3/2011 | Piersol | |

(Continued)

FOREIGN PATENT DOCUMENTS

| | | |
|---|---|---|
| CA | 2570572 C | 6/2012 |
| CN | 103179048 B | 4/2016 |

(Continued)

OTHER PUBLICATIONS

Chauhan, "Content-based Load Balancer", DZone, Aug. 26, 2016, 2 pages.

(Continued)

*Primary Examiner* — Ruolei Zong
(74) *Attorney, Agent, or Firm* — Eric W. Chesley

(57) ABSTRACT

Described are techniques for load balancing using a quality of service policy. The techniques include identifying, in response to receiving a client request at a load balancer that distributes client requests to compute resources located in a computing environment, a quality of service (QoS) policy that corresponds to the client request, where the QoS policy specifies one or more conditions for performing the client request. The techniques further include identifying a set of compute resources that comply with the one or more conditions of the QoS policy, and initiating a selection of a target compute resource from the set of compute resources to send the client request.

20 Claims, 6 Drawing Sheets

(56)         References Cited

U.S. PATENT DOCUMENTS

2015/0358236 A1 *  12/2015  Roach ................... H04L 43/065
                                                        370/235
2019/0116106 A1 *   4/2019  Mulkey .............. H04L 43/0829
2021/0321300 A9 *  10/2021  Chen .................... H04W 28/24

FOREIGN PATENT DOCUMENTS

CN          106411779  A      2/2017
CN          106790726  B      8/2020
CN          110048890  B     10/2021
EP          3968606    B1     3/2024

OTHER PUBLICATIONS

DPLP Team, "BibTeX record journals/comsis/ZhangLY10", last updated on May 21, 2019, 2 pages.

* cited by examiner

400

500

600

LOAD BALANCING USING A QUALITY OF SERVICE POLICY

BACKGROUND

The present disclosure relates to computer networks, and, more specifically, to load balancing in computer networks.

Load balancing is the process of distributing network traffic among multiple compute resources to improve service or application performance and reliability. Load balancing can be implemented in a couple of ways. As one example, hardware load balancers are physical appliances that can be installed and maintained on premises. As another example, software load balancers are applications that can be installed on privately-owned servers, or delivered as a managed cloud service (e.g., cloud load balancing). Load balancers work by mediating incoming client requests in real-time to prevent a single compute resource from becoming overloaded.

SUMMARY

Aspects of the present disclosure are directed toward a computer-implemented method comprising, in response to receiving a client request at a load balancer that distributes client requests to compute resources located in a computing environment, identifying a quality of service (QoS) policy that corresponds to the client request, where the QoS policy specifies one or more conditions for performing the client request. The computer-implemented method further comprising identifying a set of compute resources that comply with the one or more conditions of the QoS policy. The computer-implemented method further comprising initiating a selection of a target compute resource from the set of compute resources to send the client request.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
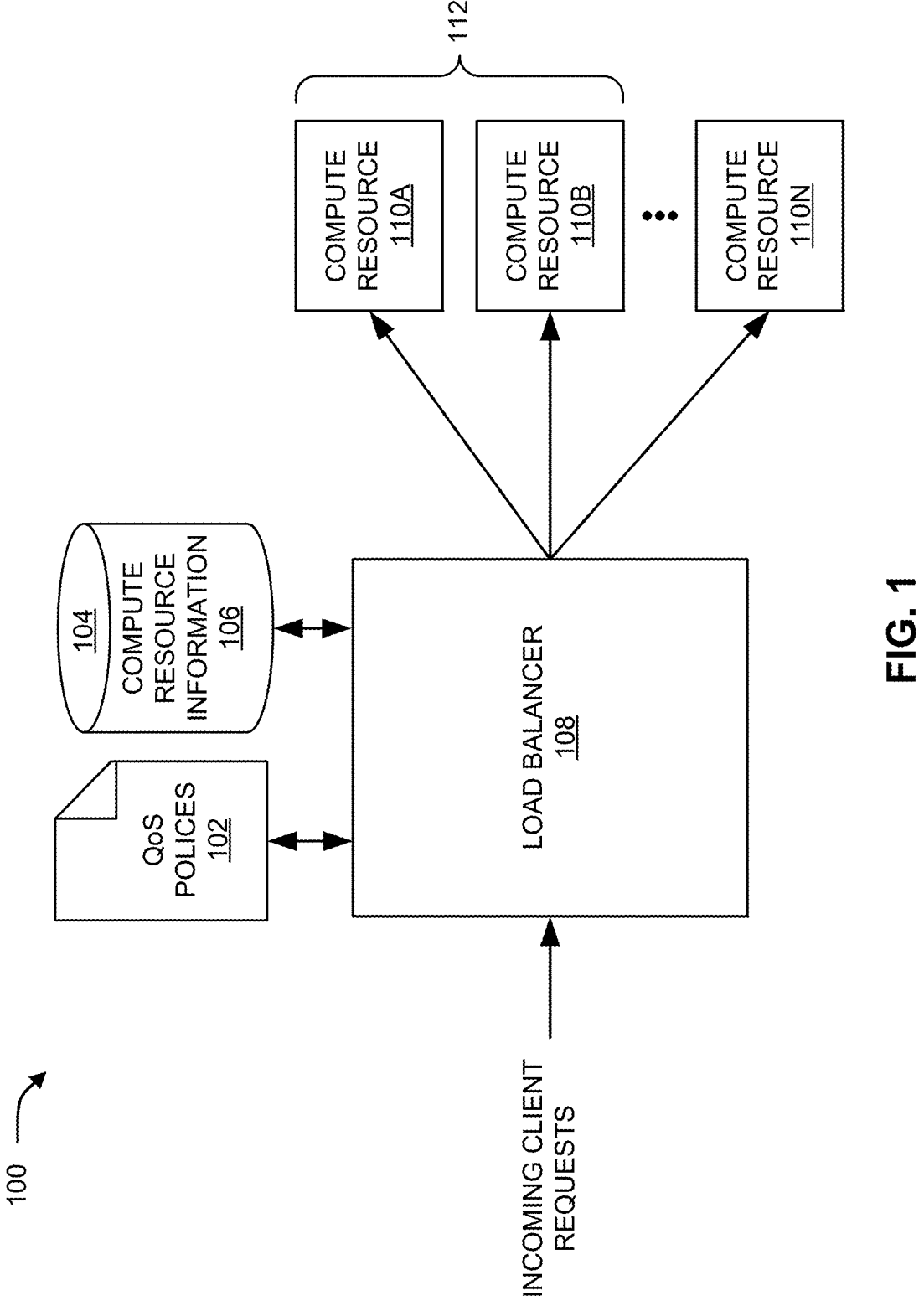
FIG. 1 is a block diagram illustrating an example computing environment implementing load balancing using a quality of service policy, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward load balancing in a computing environment using a quality of service policy. While not limited to such applications, embodiments of the present disclosure may be better understood in light of the following context.

Generally, load balancers distribute client requests among multiple compute resources to improve service and/or application performance and reliability. In the past, two main techniques have been used to determine which compute resource should handle a client request. The first technique is static load balancing, which distributes client requests without considering the current state of the system. The second technique is dynamic load balancing which adapts to real-time conditions to distribute client requests to compute resources using factors like server performance, load, and availability to mitigate overloading of the compute resources.

Applications and users of computer networks have different requirements for the service they receive from a computer network. For example, a computer network that treats all network traffic as best effort may not meet the needs of the applications and users. Service differentiation is a mechanism to provide different service levels to different types of network traffic based on service requirements. The overall service provided to an application or user is termed Quality of service (QoS). However, prior to the present disclosure, load balancers have not enforced QoS requirements of applications and/or users. That is, prior to the present disclosure, load balancers have worked to simply distribute incoming client requests to a set of compute resources in a manner that prevents overloading of any of the compute resources.

Advantageously, aspects of the present disclosure improve load balancing by enforcing a QoS policy when distributing client requests to compute resources, which can improve processing of the client requests by sending a client request to a compute resource that is correctly configured to handle the client request. The aspects of the present disclosure are an improvement in the technical field of computer networks generally, and more particularly, in the technical field of load balancing client requests in computer networks. The advantages of the present disclosure are described in detail below.

According to an aspect of the present disclosure, there is provided a computer-implemented method comprising, in response to receiving a client request at a load balancer that distributes client requests to compute resources located in a computing environment, identifying a quality of service (QoS) policy that corresponds to the client request, the QoS policy specifying one or more conditions for performing the client request. The computer-implemented method further comprising identifying a set of compute resources that comply with the one or more conditions of the QoS policy. The computer-implemented method further comprising initiating a selection of a target compute resource from the set of compute resources to send the client request.

Advantageously, performing load balancing using the QoS policy provides the technical effect of improving a respective computing system by identifying a set of compute resources that comply with the QoS policy which results in sending the client request to a compute service that is correctly (or optimally) configured for handling the client request. As one example, sending the client request to a correctly configured compute resource results in a reduced response time as compared to sending the client request to another compute resource that is not correctly configured to handle the client request. As another example, load balancing the client request using the QoS policy may reduce incidences of performance errors (e.g., incorrect software version) as compared to sending the client request to another compute resource that is not correctly configured to handle the client request. As yet another example, security for the client request may be improved by load balancing the client request using the QoS policy to identify a set of compute resources that conform to a security protocol needed to perform the client request.

According to an aspect of the computer-implemented method, identifying the QoS policy further comprises classifying the client request as being within a policy scope of the QoS policy, where information is extracted from the client request and the information is correlated to the policy scope of the QoS policy. Advantageously, defining the policy scope to enable the client request to be classified to the QoS policy realizes the technical effect of load balancing the client request to a compute resource that is correctly configured to handle the client request.

According to an aspect of the computer-implemented method, the method further comprises collecting historical performance data for client requests in a same class as the client request and determining a condition of the QoS policy based on the historical performance data. Advantageously, determining a condition of a QoS policy based on historical performance data of a class of client requests identifies a compute resource requirement for handling client requests included in the class. Identifying compute resource requirements for handling a class of client requests realizes the technical effect of load balancing the client requests to compute resources that are correctly configured to handle the client requests.

According to an aspect of the computer-implemented method, identifying the set of compute resources further comprises evaluating key performance indicators (KPIs) for the compute resources located in the computing environment to identify the set of compute resources as complying with the one or more conditions of the QoS policy. Advantageously, using KPIs to identify the set of compute resources as complying with the QoS policy realizes the technical effect of load balancing the client request to a compute resource that is correctly configured to handle the client request.

According to an aspect of the computer-implemented method, the method further comprises collecting, by the load balancer, performance information for the compute resources located in the computing environment via interactions with the compute resources, and deriving one or more of the KPIs for the compute resources from the performance information for use in identifying the set of compute resources. Advantageously, collecting performance information for the compute resources from the compute resources themselves enables the method to derive KPIs that can be used to identify the set of compute resources, which realizes the technical effect of load balancing the client request to a compute resource that is correctly configured to handle the client request.

According to another aspect of the computer-implemented method, the method further comprises obtaining information for the compute resources located in the computing environment from a system resource monitor for the computing environment, and deriving one or more of the KPIs for the compute resources from the information for use in identifying the set of compute resources. Advantageously, collecting performance information for the compute resources from the system resource monitor enables the method to derive KPIs that can be used to identify the set of compute resources, which realizes the technical effect of load balancing the client request to a compute resource that is correctly configured to handle the client request.

According to yet another aspect of the computer-implemented method, the method further comprises registering a QoS policy module with the load balancer, wherein the QoS policy module performs the identifying the QoS policy and the identifying the set of compute resources, and the QoS policy module provides information for the set of compute resources to the load balancer to allow the load balancer to select the target compute resource from the set of compute resources. Advantageously, registering the QoS policy module with the load balancer realizes the technical effect of load balancing client requests to compute resources that are correctly configured to handle the client requests.

Aspects of the present disclosure can be relevant to multiple technical use cases. In one example technical use case, in the context of a computing environment provided by a computing service provider (e.g., a cloud service environment), a QoS policy module can be registered with a load balancer at a prescribed hook point (e.g., by code modification or dynamic interception). Thereafter, in response to receiving an incoming message containing a client request, the load balancer interacts with the policy module to determine a set of compute resources for load balancing the client request. For example, the policy module can intercept the message containing the client request at the hook point and classify the client request to a QoS policy using information extracted from the message header and/or message content. The QoS policy module then determines a set of compute resources hosted in the computing environment that complies with the conditions of the QoS policy, and the QoS policy module passes information for the set of compute resources to the load balancer. In response, the load balancer selects a target compute resource from the set of compute resources, and the load balancer sends the client request to the target compute resource.

Referring now to the figures, FIG. 1 illustrates a block diagram of one example of a computing environment 100 for implementing load balancing using a quality of service policy, in accordance with some embodiments of the present disclosure. As illustrated, the computing environment 100 includes a load balancer 108 configured to distribute client requests to compute resources 110A, 110B, 110N (collectively 110, where N can refer to any positive integer representing any number of compute resources). A compute resource 110 can comprise hardware and/or software components that provide the processing, storage, and memory needed to execute applications, serverless functions, methods, tasks, and the like. For example, a compute resource 110 can be a physical machine (e.g., a server) and/or a virtual machine configured to perform computational tasks.

Load balancing is a networking technique that distributes client requests across multiple compute resources 110. Quality of service refers to the overall service that a user or application receives from a computer network (e.g., a system that connects two or more computing devices for transmitting and sharing data) in terms of throughput, delay, security, environmental impact, etc. Service differentiation is the ability of the computer network to provide different QoS levels to different users or applications based on their needs. A service level agreement (SLA) is a contract that details the QoS that the users or applications are expected to receive, and a QoS policy 102 provides administrative controls for the load balancer 108 to distribute client requests to a compute resource 110 that satisfies the conditions of the QoS policy 102, which may be needed to achieve the QoS promised by a given SLA.

As part of distributing client requests to compute resources 110, the load balancer 108 enforces one or more conditions (or requirements) of one or more QoS policies 102 that correspond to the client requests. As referred to herein, a client request is a mechanism that enables communication and data exchange in a networked environment, allowing clients (e.g., hardware and/or software) to access services provided by compute resources 110. Illustratively, a client comprises a device or application that initiates communication by sending client requests to compute resources 110 for specific tasks, data, and/or services. The interaction between the clients and the compute resources 110 is facilitated through well-defined communication protocols. A client specifies a desired service or resource in a client request, and the load balancer 108 selects a compute resource 110 to handle (process) the client request according to a QoS policy 102 for the client request, as well as other load balancing considerations to prevent overloading of any one compute resource 110.

A QoS policy 102 for load balancing refers to a set of conditions, rules, or requirements for identifying one or more compute resources 110 that are qualified to handle a type or class of client request. The set of conditions, rules, or requirements can comprise compute resource requirements, such as processor, memory, storage, network, security, software, and/or application requirements. As non-limiting examples, a QoS policy may include: a compute power requirement (e.g., a minimum amount of processor, memory, and/or network bandwidth), a media type requirement (e.g., a streaming application optimized for streaming a particular media type), a security protocol requirement (e.g., a condition that a server provide secure socket layer (SSL) encryption), a tail latency requirement, an average response time requirement (e.g., a condition that a server have an average response time of 5 milliseconds (5 ms)), as well as other conditions, rules, or requirements. In some embodiments, as described later in association with FIG. 3, the set of conditions, rules, or requirements of the QoS policy 102 can be formed by collecting historical performance data associated with client requests (e.g., historical performance data for a type or class of client request) and analyzing the historical performance data to determine compute resource requirements for handling the client requests.

A QoS policy 102 also defines a policy scope for enforcing the QoS policy 102. The policy scope associates the QoS policy 102 with client requests that correspond to the policy scope. For example, the policy scope can define one or more attributes that can be correlated to a client request. Illustratively, the attributes can include: a client-request identifier (e.g., an application ID, a user ID, device ID, etc.), a request type (e.g., a streaming media request, a finance related request, an artificial intelligence (AI) related request, etc.), request requirement (e.g., environmental impact requirement, security protocol requirements, etc.), as well as any other attribute that can be used to correlate a QoS policy 102 to a client request.

A QoS policy 102 can be configured using a set of configuration statements and parameters coded into, for example, a flat file, data record, etc., which can be referenced by the load balancer 108. In some embodiments, a user (e.g., a customer of the computing environment 100) can configure a QoS policy 102 for the user's client requests. In other embodiments, an enterprise that provides a computing environment 100 can configure a QoS policy 102 for some or all of its user's client requests. Additionally, in some embodiments, a QoS policy 102 can be user agnostic, such that the QoS policy 102 is applied to client requests in the same way regardless of the user associated with the client requests.

As part of distributing client requests to compute resources 110, the load balancer 108 references the policy scope of the QoS policy 102 to determine whether to enforce the condition(s) of the QoS policy 102 when selecting a set of candidate compute resources for handling the client requests. The load balancer 108 is provided access to compute resource information 106 to enable the load balancer 108 to identify one or more compute resources 110 that are able to satisfy a QoS policy 102 for a client request. Illustratively, the compute resource information 106 can include compute resource properties (e.g., server name, processor information, memory information, security information, etc.), characteristics (e.g., server sessions, server state, server health information, server power consumption, etc.), key performance indicators (e.g., server uptime, disk usage, average response time, request per second, error rate, etc.) and the like.

As illustrated in FIG. 1, incoming client requests are provided to the load balancer 108, and in response, the load balancer 108 is configured to enforce QoS policies 102 that may be associated with the incoming client requests to distribute the client requests to target compute resources 110 that satisfy the conditions of the QoS policies 102. More specifically, in response to receiving a client request, the load balancer 108 determines whether to enforce a QoS policy 102 for the client request. In some embodiments, the load balancer 108 makes this determination by classifying the client request as being associated with a QoS policy 102. The load balancer 108 classifies the client request by extracting information from the client request (e.g., from a message header and/or content) and correlates the extracted information to a QoS policy 102 (i.e., an attribute defining the policy scope of the QoS policy 102). The information extracted from the message can include, but is not limited to, a source of the client request, an issuer of the client request, an action or task being requested, and/or other information that can be correlated to a QoS policy 102.

In the case that the load balancer 108 is able to correlate the client request to a QoS policy 102, the load balancer 108 then identifies a set of compute resources 112 that satisfies the condition(s) of the QoS policy 102. In some embodiments, the load balancer 108 identifies the set of compute resources 112 based on KPIs for the set of compute resources 112. As illustrated in FIG. 1, the load balancer 108 has access to compute resource information 106 that can include KPIs for the compute resources 110 included in the computing environment 100. As described earlier, the compute resource information 106 can be collected in a datastore 104. The load balancer 108 can query the datastore 104 to identify a set of compute resources 112 that have KPIs that satisfy a condition(s) of a QoS policy 102. As a non-limiting example, a QoS policy 102 may condition that a compute resource 110 have an average response time of ten milliseconds (10 ms) and provide secure socket layer (SSL) encryption. In a scenario where a client request is classified to this QoS policy 102, the load balancer 108 queries the datastore 104 for a list of compute resources 110 that have average response times of 10 ms and provide SSL encryption. The list of compute resources 110 returned by the query to the load balancer 108 forms a set of compute resources 112 identifies as being able to satisfy the QoS policy 102.

After identifying the set of compute resources 112 determined as able to satisfy the QoS policy 102, the load balancer 108 selects a target compute resource (e.g., compute resource 110A) from the set of compute resources 112 and sends the client request to the target compute resource. In some embodiments, the load balancer 108 selects the target compute resource using a load balancing technique that seeks to distribute client requests among the set of compute resources 112 so as to prevent any of the compute resources in the set from becoming overburdened. The load balancer 108 can use any load balancing technique to distribute a client request to a target compute resource in the set of compute resources 112, including: round robin, weighted round robin, least connection, weighted least connection, resource based, as well as other types of load balancing techniques.

Figure 2:
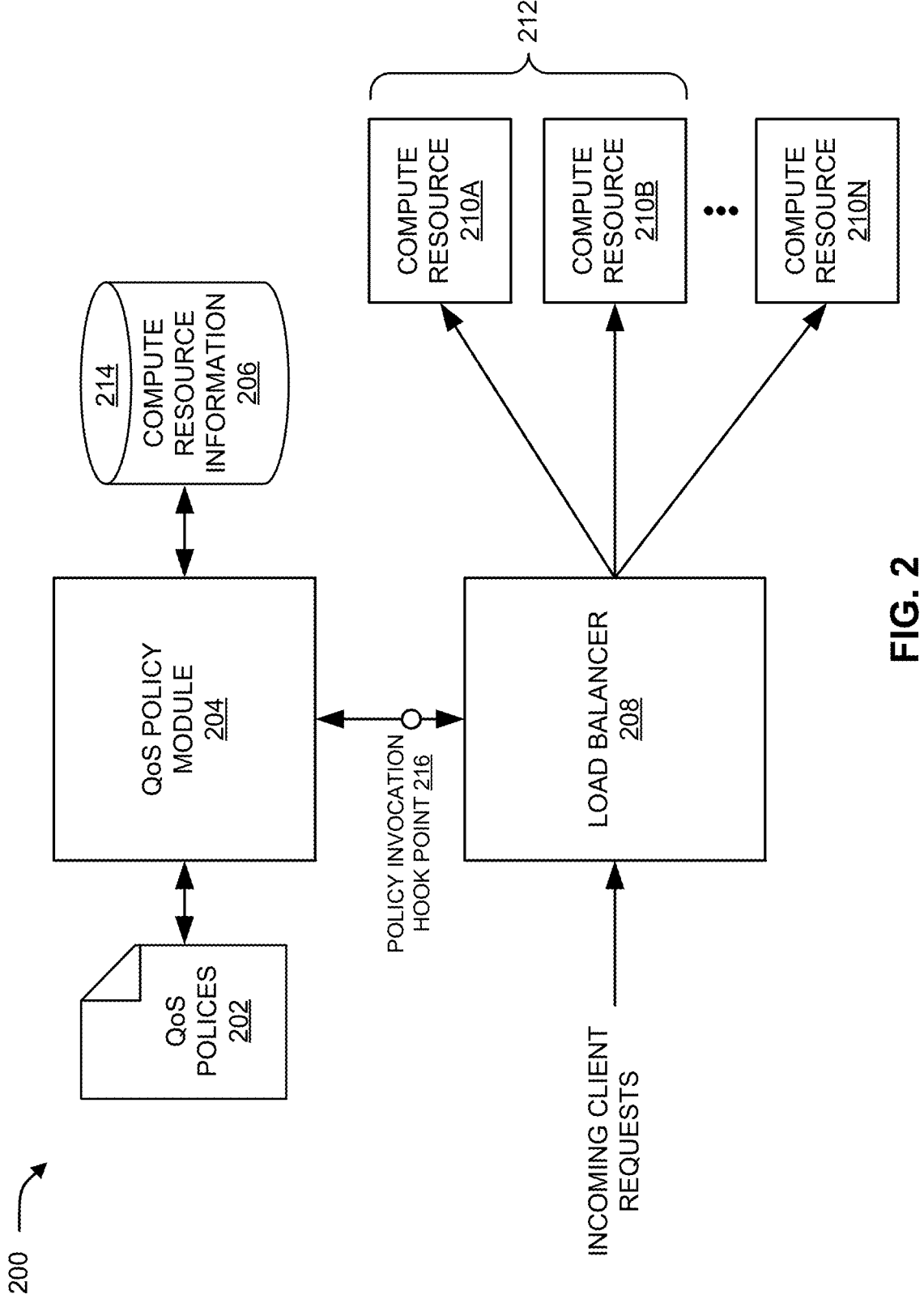
FIG. 2 is a diagram that illustrates another example computing environment for implementing load balancing using a quality of service policy, in accordance with some embodiments of the present disclosure.

FIG. 2 illustrates a block diagram of another example computing environment 200 for implementing load balancing using a quality of service policy, in accordance with some embodiments of the present disclosure. As illustrated, the computing environment 200 includes a QoS policy module 204 that interfaces with a load balancer 208 to identify a QoS policy 202 that corresponds to an incoming client request and identify a set of compute resources 212 that satisfy the QoS policy 202.

The QoS policy module 204 can comprise a plugin module (e.g., add-on or extension software) that adds QoS features to the load balancer 208. The QoS policy 202 can be registered with the load balancer 208 using a shared library (e.g., a dynamic-link library (DLL)) or another type of interface that enables the load balancer 208 to communicate with the QoS policy module 204. Registering the QoS policy module 204 with the load balancer 208 provides a policy invocation hook point 216 for intercepting incoming client requests. For example, a hook procedure can monitor the load balancer 208 for incoming client requests and provide the client requests to the QoS policy module 204.

The QoS policy module 204 enforces QoS policies 202 by determining that a policy scope of a QoS policy 202 pertains to an intercepted client request and identifying a set of compute resources 212 that comply with one or more conditions or requirements of the QoS policy 202. In some embodiments, the QoS policy module 204 determines that a QoS policy 202 applies to a client request by classifying the client request as being associated with a QoS policy 202. The QoS policy module 204 classifies the client request by extracting information from the client request (e.g., from a message header and/or message content) and correlates the extracted information to an attribute defining a policy scope of the QoS policy 202. As described earlier, the information extracted from the client request can include, but is not limited to, a source of the client request, an issuer of the client request, an action or task being requested, as well as other information that can be correlated to a QoS policy 202.

After the QoS policy module 204 correlates a client request to a QoS policy 202, the QoS policy module 204 identifies a set of compute resources 212 that complies with the condition(s) of the QoS policy 202. As described earlier in association with FIG. 1, compute resource information 206 for compute resources 210A, 210B, 210N (collectively 210, where N can refer to any positive integer representing any number of compute resources) can be collected in a datastore 214, and the compute resource information 206 can be used by the QoS policy module 204 to identify a set of compute resources 212 that corresponds to one or more conditions of a QoS policy 202. For example, the QoS policy module 204 can query the datastore 214 to identify a set of compute resources 212 having KPIs that satisfy the one or more conditions of the QoS policy 202. Querying the datastore 214 can comprise querying the datastore 214 with the one or more conditions of the QoS policy 202 (e.g., return compute resources having an average response time of 10 ms and configured for SSL encryption), and receiving information (e.g., server identifiers, server names, etc.) for a set of compute resources 212 returned by the query.

After identifying a set of compute resources 212 determined by the QoS policy module 204 as complying with the condition(s) of the QoS policy 202, the QoS policy module 204 provides the information (e.g., server identifiers, server names, etc.) for the set of compute resources 212 to the load balancer 208. In response to receiving the information for the set of compute resources 212, the load balancer 208 selects a target compute resource (e.g., compute resource 210A) from the set of compute resources 212 and sends the client request to the target compute resource. In some embodiments, as described earlier in association with FIG. 1, the load balancer 208 can select the target compute resource using a load balancing technique (e.g., round robin, weighted round robin, least connection, weighted least connection, resource based, etc.) that seeks to distribute client requests among the set of compute resources 212 so as to prevent any of the compute resources in the set from becoming overwhelmed.

Figure 6:
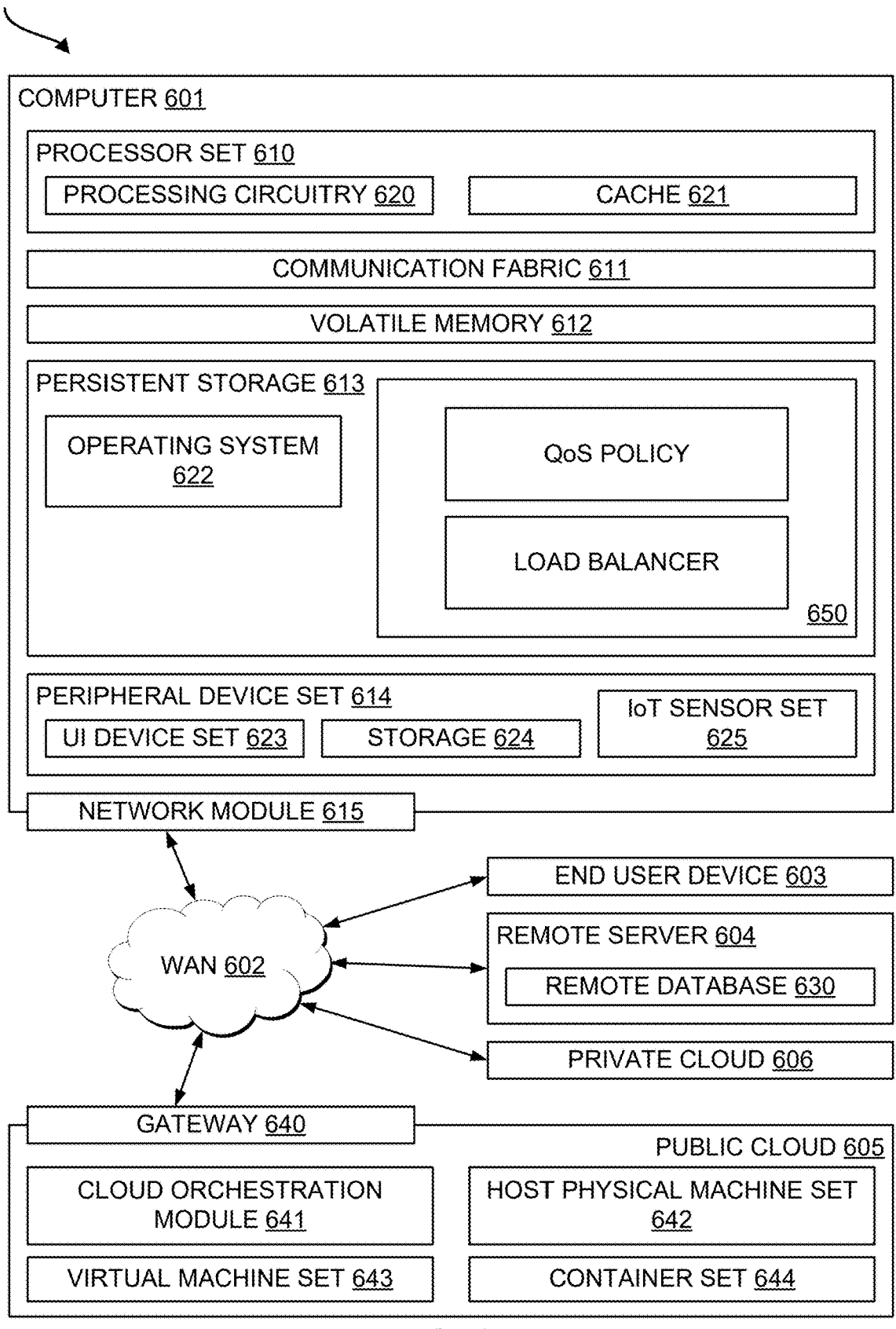
FIG. 6 is a block diagram that illustrates an example computing environment in which aspects of the present disclosure can be implemented, in accordance with some embodiments of the present disclosure.

All or a portion of the components shown in FIG. 1 and FIG. 2 can be implemented, for example, by all or a subset of the computing environment 600 of FIG. 6. The load balancer 108 and/or the QoS policy module 204 can be implemented in software, hardware, firmware, or a combination thereof. When software is used, the operations performed by the load balancer 108 and/or the QoS policy module 204 can be implemented in program instructions configured to run on hardware, such as a processor. When firmware is used, the operations can be implemented in program instructions and data and stored in persistent memory to execute on a processor. When hardware is employed, the hardware can include circuits that operate to perform the operations.

Generally, modules (also referred to as program modules) include routines, programs, components and/or data structures that perform particular tasks and/or implement particular abstract data types. In some embodiments, a module, such as the QoS policy module 204, can be implemented as a computing service hosted in a computing environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules. As will be appreciated, a network enables communication between the components of the computational environments shown in FIG. 1 and FIG. 2.

The terms "component", "system", "platform", and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine (e.g., within a public or private cloud). The term "datastore" is utilized to refer to a memory device or components comprising a memory. Memory and/or memory components described herein can be either volatile memory or nonvolatile memory, or can include both volatile and nonvolatile memory.

While FIG. 1 and FIG. 2 illustrate examples of a computational environment that can implement the techniques above, many other similar or different environments are possible. The example environments discussed and illustrated above are merely representative and not limiting.

Figure 3:
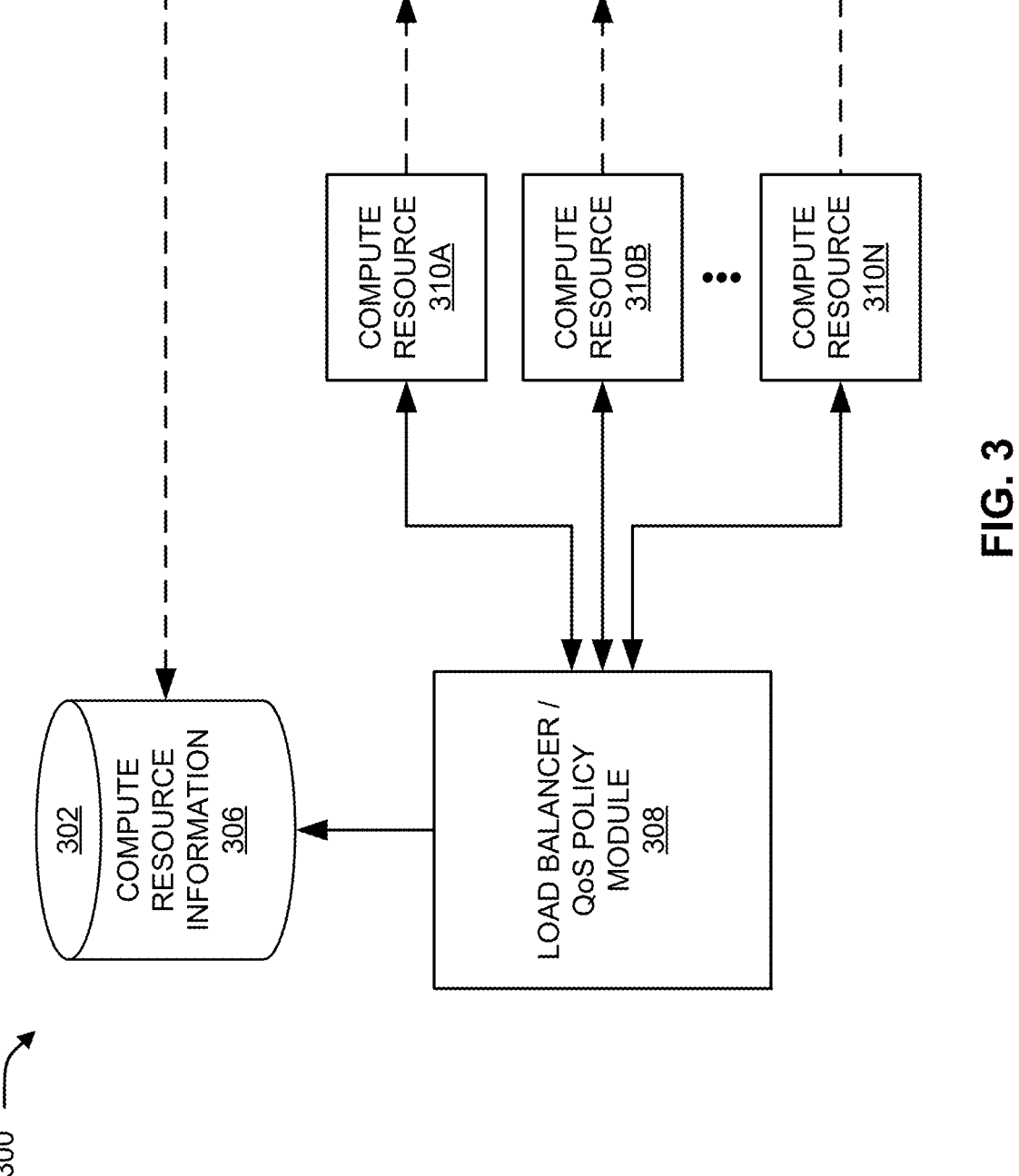
FIG. 3 a diagram illustrating the collection of compute resource information 306 used to enforce a QoS policy in load balancing, in accordance with some embodiments of the present disclosure.

FIG. 3 is a diagram illustrating the collection of compute resource information 306 in a computing environment 300 for use in enforcing a QoS policy in load balancing, in accordance with some embodiments of the present disclosure. As described in association with FIG. 1 and FIG. 2, a load balancer or a QoS policy module 308 evaluates compute resource information 306 for compute resources 310A, 310B, 310N (collectively 310, where N can refer to any positive integer representing any number of compute resources) to identify a set of compute resources 310A/310B that, based on respective compute resource information 306, are able to satisfy the conditions of a QoS policy that corresponds to a client request. Illustratively, the compute resource information 306 can include compute resource properties (e.g., server name, processor information, memory information, security information, etc.), characteristics (e.g., server sessions, server state, server health information, server power consumption, etc.), key performance indicators (e.g., server uptime, disk usage, average response time, request per second, error rate, etc.) and the like.

As illustrated in FIG. 3, the compute resource information 306 can be obtained from various sources. In some embodiments, compute resource information 306 can be obtained from in-bound sources (depicted in FIG. 3 using a solid line). As an example, compute resource information 306 can be derived from interactions between the load balancer/QoS policy module 308 and the compute resources 310. For example, through interactions between the load balancer/QoS policy module 308 and a compute resource 310, the load balancer/QoS policy module 308 can measure an average response time of the compute resource 310 and derive metrics for identifying a set of compute resources 310A/310B that can satisfy a QoS policy for a client request.

In some embodiments, compute resource information 306, can be obtained from out-of-bound sources (depicted in FIG. 3 using a dashed line). As an example, compute resource information 306 can be collected by a system resource monitor or control plane (not shown) and the load balancer/QoS policy module 308 can use the compute resource information 306 to identify a set of compute resources 310A/310B that complies with a QoS policy for a client request. For example, an information collection protocol (e.g., the UNIX vmstat tool or similar system monitoring tools) can be utilized to collect compute resource information 306, which can be stored in a datastore 302 to enable the load balancer/QoS policy module 308 to access the compute resource information 306 as part of distributing client requests to the compute resources 310. As another example, each compute resource 310 can push compute resource information 306 to a datastore 302 that is accessible to the load balancer/QoS policy module 308.

The load balancer/QoS policy module 308 can derive (calculate) one or more KPIs from the compute resource information 306 (e.g., periodically or in response to a client request) collected in the datastore 302 for use in identifying a set of compute resources 310A/310B that can satisfy a QoS policy for a client request. As will be appreciated, in some embodiments, the compute resource information 306 stored in the datastore 302 can be obtained from both in-bound and out-of-bound sources. Also, in some embodiments, the compute resource information 306 can be obtained directly from a source at or near the time that the load balancer/QoS policy module 308 utilizes the compute resource information 306 to identify a set of compute resources 310A/310B.

As mentioned earlier in association with FIG. 1, in some embodiments, historical performance data related to performing a client request (type or class of client request) can be collected using the techniques described above, and the historical performance data can be used to determine one or more compute resource requirements (e.g., processor, memory, storage, network, security, software, and/or application requirements) for handling future client requests.

As described previously, a QoS policy specifies a set of conditions, rules, or requirements that are needed for a compute resource 310 to handle a particular client request. Non-limiting examples of conditions, rules, or requirements of the QoS policy can include: a compute power requirement, a media type requirement, a security protocol requirement, a tail latency requirement, an average response time requirement, as well as other conditions, rules, or requirements. Historical performance data collected for a type or class of client request can be used to form, at least in part, the set of conditions, rules, or requirements of the QoS policy. The load balancer/QoS policy module 308 can be configured to analyze compute resource information 306 collected to the datastore 302 (or obtained directly from a compute resource information source) and identify historical performance data related to a type of class of client request that corresponds to the compute resource information 306. The load balancer/QoS policy module 308 can then determine a QoS policy for the type or class of client request, and thereafter, apply the QoS policy to respective incoming client requests. In some embodiments, an artificial intelligence (AI) model can be trained to generate a QoS policy for a type or class of client request using the historical performance data.

Figure 4:
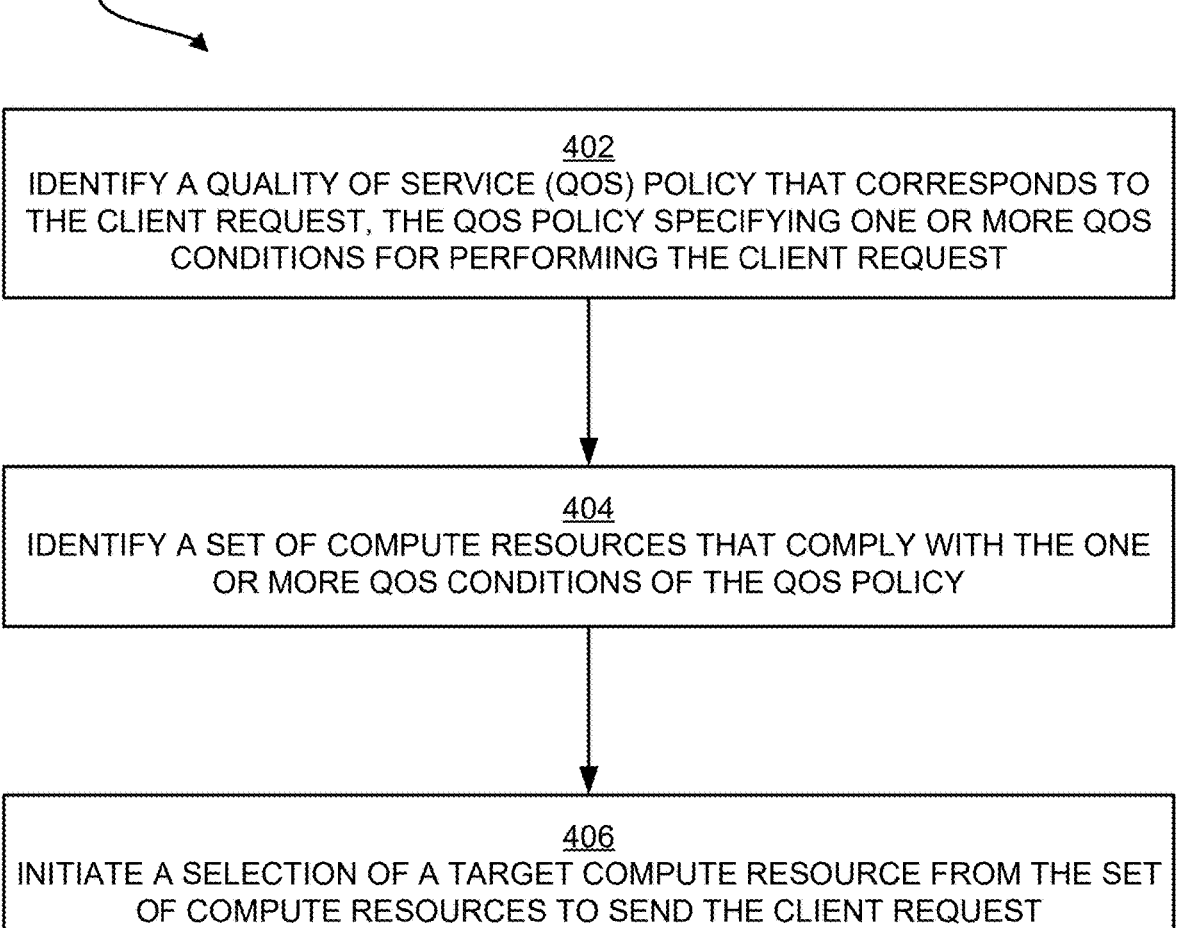
FIG. 4 is a flow diagram illustrating an example method for load balancing in a computing environment using a quality of service policy, in accordance with some embodiments of the present disclosure.

FIG. 4 is a flow diagram illustrating an example method 400 for load balancing in a computing environment using a quality of service policy, in accordance with some embodiments of the present disclosure. In operation 402, in response to receiving a client request at a load balancer that distributes client requests to compute resources located in the computing environment, the method 400 identifies a QoS policy that corresponds to the client request, where the QoS policy specifies one or more conditions for performing the client request.

The QoS policy provides administrative controls to the load balancer for distributing the client request to a compute resource that satisfies the condition(s) of the QoS policy. More specifically, the QoS policy defines a policy scope that associates the QoS policy with a type or class of client request. The policy scope of the QoS policy can be defined using one or more attributes that can be correlated to a client request. In some embodiments, the attributes can be provided by a user (e.g., a service provider customer) and/or a system administrator. Illustratively, the attributes used to define the policy scope can include: a client-request identifier (e.g., an application ID, a user ID, device ID, etc.), a request type (e.g., a streaming media request, a finance related request, an artificial intelligence (AI) related request, etc.), request requirement (e.g., environmental impact requirement, security protocol requirements, etc.), as well as any other attribute that can be correlated to the client request.

The set of conditions, rules, or requirements of the QoS policy for identifying the set of compute resources can comprise compute resource requirements, such as processor, memory, storage, network, security, software, and/or application requirements. In some embodiments, as described earlier in association with FIG. 3, the condition(s) of the QoS policy can be formed by collecting historical performance data for client requests (e.g., a type or class of client requests) and analyzing the historical performance data to determine compute resource requirements for handling the client requests. Non-limiting examples of conditions, rules, or requirements of the QoS policy can include: a compute power requirement, a media type requirement, a security protocol requirement, a tail latency requirement, an average response time requirement, and other conditions, rules, or requirements as will be appreciated.

In some embodiments, the method 400 identifies the QoS policy as corresponding to the client request by classifying the client request. For example, the method 400 can extract information from the client request (e.g., from a message header and/or message content) and the method 400 can correlate the information to the policy scope of the QoS policy. As one example, a client-request identifier (e.g., an application ID, a user ID, device ID, etc.) can be extracted from the client request and the client-request identifier can be correlated to the policy scope of the QoS policy. As another example, a request type (e.g., a streaming media request, a finance related request, an artificial intelligence (AI) related request, etc.) can be extracted from the client request and the request type can be correlated to the policy scope of the QoS policy. As yet another example, a request requirement (e.g., environmental impact requirement, security protocol requirements, etc.) can be extracted from the client request and the request requirement can be correlated to the policy scope of the QoS policy. As will be appreciated, a combination of information (e.g., client-request identifier, request type, request requirement) can be correlated to a policy scope of a QoS policy.

In operation 404, the method 400 identifies a set of compute resources that comply with the one or more conditions of the QoS policy. In some embodiments, identifying the set of compute resources includes evaluating KPIs for the compute resources located in the computing environment to identify the set of compute resources as being able to satisfy the one or more conditions of the QoS policy. In some embodiments, the method 400 collects performance information for the compute resources located in the computing environment by interfacing with the compute resources, and the method derives one or more of the KPIs for the compute resources from the performance information for use in identifying the set of compute resources. Also, in some embodiments, the method 400 obtains information for the compute resources located in the computing environment from a system resource monitor or control plane for the computing environment, and the method 400 derives one or more of the KPIs for the compute resources from the information for use in identifying the set of compute resources.

After identifying a set of compute resources that satisfy the one or more conditions of the QoS policy, the method 400 in operation 406 initiates a selection of a target compute resource from the set of compute resources to send the client request. For example, in embodiments where a QoS policy module intercepts incoming client requests (as shown in FIG. 2), the QoS policy module sends a list of compute resources that satisfy the QoS policy to a load balancer, which in response, selects a target compute resource from the list of compute resources using a load balancing technique (e.g., round robin, weighted round robin, least connection, weighted least connection, resource based, and the like) and sends the client request to the target compute resource. Alternatively, in embodiments where a load balancer is configured to enforce a QoS policy, the load balancer can first identify a set of compute resources that satisfy a QoS policy, and thereafter, the load balancer can select a target compute resource from the set of compute resources using a load balancing technique and send the client request to the target compute resource.

Figure 5:
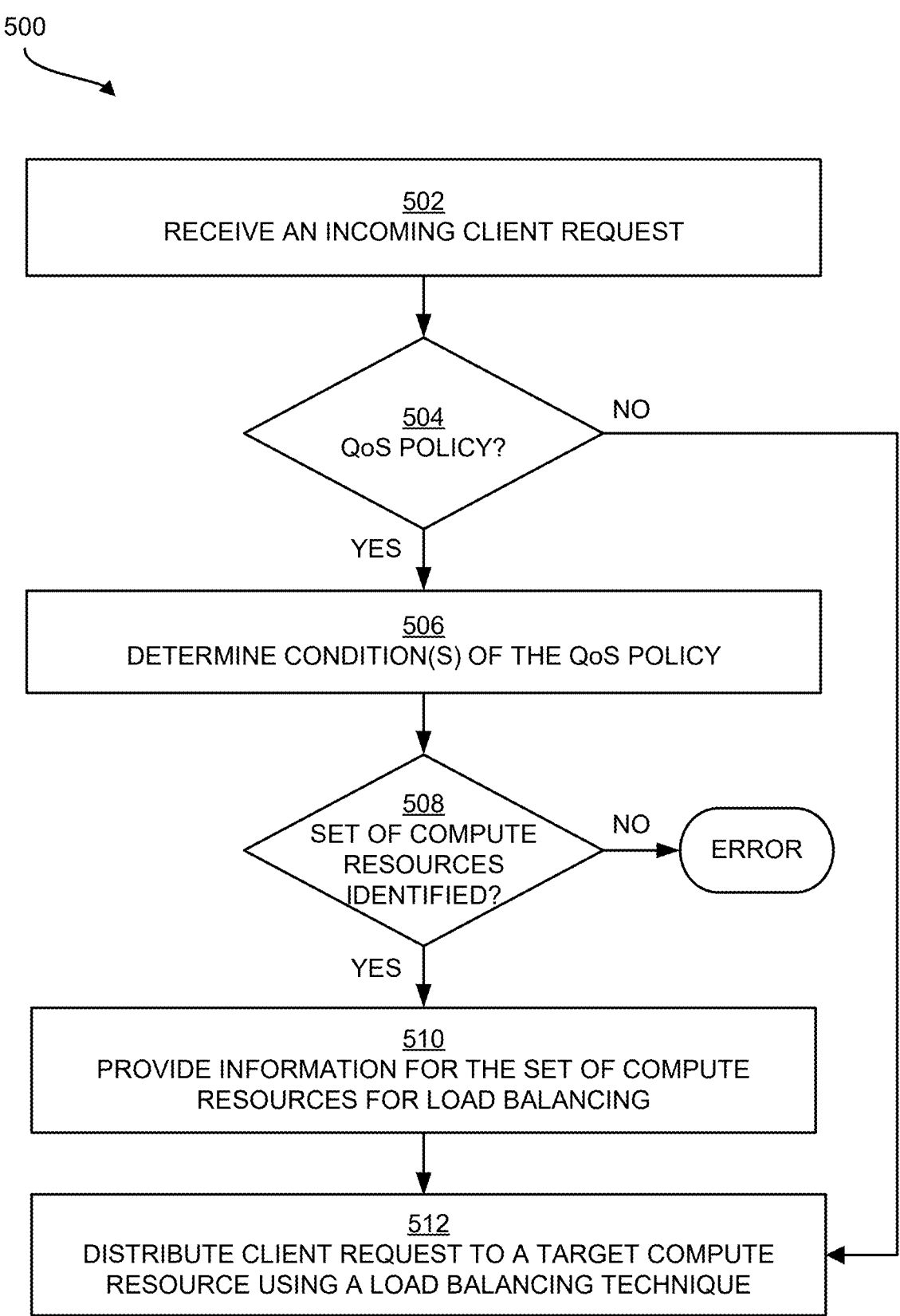
FIG. 5 is a flow diagram illustrating another example method for load balancing that enforces a QoS policy, in accordance with some embodiments of the present disclosure.

FIG. 5 is a flow diagram illustrating another example method 500 for load balancing that enforces a QoS policy, in accordance with some embodiments of the present disclosure. In operation 502, the method 500 receives an incoming client request. In response, the method 500 determines whether the client request is associated with a QoS policy for determining a target compute resource to handle the client request. The method 500 makes this determination by classifying the client request to a QoS policy, as described earlier. In the case that the method 500 is unable to classify the client request to a QoS policy, the method 500, in operation 512, distributes the client request to a target compute resource without enforcing a QoS policy using a load balancing technique (e.g., round robin, weighted round robin, least connection, weighted least connection, resource based, etc.). That is, in the case that a QoS policy does not exist for a particular client request, no QoS enforcement is needed and a load balancing technique, such as round robin, can be performed to send the client request to a target compute resource.

Returning to operation 504, in the case that the client request is classified to a QoS policy, the method 500 proceeds to operation 506 to determine the condition(s) of the QoS policy. As described earlier, the condition(s) of a QoS policy comprise one or more compute resource requirements (e.g., processor, memory, storage, network, security, software, and/or application requirements) for a compute resource needed to handle (process) the client request. In operation 508, the method 500 determines whether a set of compute resources individually satisfy the condition(s) of the QoS policy exists. For example, the method 500 can evaluate the compute resources included in a computing environment that are available to handle client requests to determine which of the compute resources meet the condition(s) of the QoS policy, as previously described herein. In the case that the method 500 is unable to identify a set of compute resources that satisfy the condition(s) of the QoS policy, the method 500 may generate an error, and a client associated with the client request may be notified of the error. Alternatively, in response to the error, the method 500 can perform one of the following: request that a compute resource that meets the condition(s) of the QoS policy be launched (e.g., via virtual machine scaling), drop the client request, or distribute the client request to a target compute resource without enforcing the QoS policy using a load balancing technique (e.g., round robin, weighted round robin, least connection, weighted least connection, resource based, etc.).

In the case that a set of compute resources is identified, the method 500 in operation 510 provides information for the set of compute resources to allow load balancing of the client request to a target compute resource selected from the set of compute resources. In operation 512, the method 500 selects a target compute resource from the set of compute resources using a load balancing technique (e.g., round robin, weighted round robin, least connection, weighted least connection, resource based, etc.) and sends the client request to the target compute resource.

The methods described above can be performed by a computer (e.g., computer 601 in FIG. 6), performed in a cloud environment (e.g., clouds 606 or 605 in FIG. 6), and/or generally can be implemented in fixed-functionality hardware, configurable logic, logic instructions, etc., or any combination thereof. In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage media or medium, as the terms are used in the present disclosure, are not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the disclosed methods, such as computer code in block 650 for a load balancer that enforces a QoS policy or a QoS policy module that enforces conditions of a QoS policy for load balancing client requests. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 621 and the other storage media discussed below. The computer readable program instructions, and associated data, are accessed by processor set 610 to control and direct performance of the disclosed methods. In computing environment 600, at least some of the instructions for performing the disclosed methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the disclosed methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the disclosed methods can typically be downloaded to computer 601 from an external computer or external storage device through a network adapter card or network interface included in network module 615.

WAN 602 is any wide area network (for example, the Internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. As used herein, when used with reference to items, "a set of" means one or more of the items. For example, a set of compute resources is one or more different types of compute resources. Similarly, "a number of," when used with reference to items, means one or more of the items. Moreover, "a group of" or "a plurality of" when used with reference to items, means two or more of the items. Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A computer-implemented method comprising:
receiving a client request at a load balancer that distributes client requests to compute resources located in a computing environment, wherein the client request specifies both a service request and a configuration requirement of a compute resource that is to perform the service request;
identifying, by the load balancer, a quality of service (QoS) policy that corresponds to the configuration requirement specified by the client request, the QoS policy specifying one or more conditions for performing the client request;
identifying, by the load balancer, a set of compute resources that comply with the one or more conditions of the QoS policy; and
selecting, by the load balancer, a target compute resource from the set of compute resources to send the client request.

2. The computer-implemented method of claim 1, wherein identifying the QoS policy further comprises:
classifying the client request as being within a policy scope of the QoS policy, wherein information is extracted from the client request and the information is correlated to the policy scope of the QoS policy.

3. The computer-implemented method of claim 1, further comprising:
collecting historical performance data for client requests in a same class as the client request; and
determining a condition of the QoS policy based on the historical performance data.

4. The computer-implemented method of claim 1, wherein identifying the set of compute resources further comprises:
evaluating key performance indicators (KPIs) for the compute resources located in the computing environment to identify the set of compute resources as complying with the one or more conditions of the QoS policy.

5. The computer-implemented method of claim 4, further comprising:
collecting, by the load balancer, performance information for the compute resources located in the computing environment via interactions with the compute resources; and
deriving one or more of the KPIs for the compute resources from the performance information for use in identifying the set of compute resources.

6. The computer-implemented method of claim 4, further comprising:
obtaining configuration information of the compute resources located in the computing environment from a system resource monitor for the computing environment; and
deriving one or more of the KPIs for the compute resources from the configuration information for use in identifying the set of compute resources.

7. The computer-implemented method of claim 1, further comprising registering a QoS policy module with the load balancer, wherein the QoS policy module performs the identifying the QoS policy and the identifying the set of compute resources, and the QoS policy module provides information for the set of compute resources to the load balancer to allow the load balancer to select the target compute resource from the set of compute resources.

8. A system comprising:

one or more computer readable storage media storing program instructions and one or more processors which, in response to executing the program instructions, are configured to:

receiving a client request at a load balancer that distributes client requests to compute resources located in a computing environment, wherein the client request specifies both a service request and a configuration requirement of a compute resource that is to perform the service request;

identify, by the load balancer, a quality of service (QoS) policy that corresponds to the configuration requirement specified by the client request, the QoS policy specifying one or more conditions for performing the client request;

identify, by the load balancer, a set of compute resources that comply with the one or more conditions of the QoS policy; and select, by the load balancer, a target compute resource from the set of compute resources to send the client request.

9. The system of claim 8, wherein the program instructions configured to cause the one or more processors to identify the QoS policy are further configured to cause the one or more processors to:

classify the client request as being within a policy scope of the QoS policy, wherein information is extracted from the client request and the information is correlated to the policy scope of the QoS policy.

10. The system of claim 8, wherein the program instructions are further configured to cause the one or more processors to:

collect historical performance data for client requests in a same class as the client request; and determine a condition of the QoS policy based on the historical performance data.

11. The system of claim 8, wherein the program instructions configured to cause the one or more processors to identify the set of compute resources are further configured to cause the one or more processors to:

evaluate key performance indicators (KPIs) for the compute resources located in the computing environment to identify the set of compute resources as able to satisfy the one or more conditions of the QoS policy.

12. The system of claim 11, wherein the program instructions are further configured to cause the one or more processors to:

collect, by the load balancer, performance information for the compute resources located in the computing environment via interactions with the compute resources; and derive one or more of the KPIs for the compute resources from the performance information for use in identifying the set of compute resources.

13. The system of claim 12, wherein the program instructions are further configured to cause the one or more processors to:

obtain configuration information of the compute resources located in the computing environment from a system resource monitor for the computing environment; and derive one or more of the KPIs for the compute resources from the configuration information for use in identifying the set of compute resources.

14. The system of claim 8, further comprising registering a QoS policy module with the load balancer, wherein the QoS policy module performs the identifying the QoS policy and the identifying the set of compute resources, and the QoS policy module provides information for the set of compute resources to the load balancer to allow the load balancer to select the target compute resource from the set of compute resources.

15. A computer program product comprising:

one or more computer readable storage media, and program instructions collectively stored on the one or more computer readable storage media, the program instructions configured to cause one or more processors to:

receiving a client request at a load balancer that distributes client requests to compute resources located in a computing environment, wherein the client request specifies both a service request and a configuration requirement of a compute resource that is to perform the service request;

identify, by the load balancer, a quality of service (QoS) policy that corresponds to the configuration requirement specified by the client request, the QoS policy specifying one or more conditions for performing the client request;

identify, by the load balancer, a set of compute resources that comply with the one or more conditions of the QoS policy; and select, by the load balancer, a target compute resource from the set of compute resources to send the client request.

16. The computer program product of claim 15, wherein the program instructions configured to cause the one or more processors to identify the QoS policy are further configured to cause the one or more processors to:

classify the client request as being within a policy scope of the QoS policy, wherein information is extracted from the client request and the information is correlated to the policy scope of the QoS policy.

17. The computer program product of claim 15, wherein the program instructions are further configured to cause the one or more processors to:

collect historical performance data for client requests in a same class as the client request; and determine a condition of the QoS policy based on the historical performance data.

18. The computer program product of claim 15, wherein the program instructions configured to cause the one or more processors to identify the set of compute resources are further configured to cause the one or more processors to:

evaluate key performance indicators (KPIs) for the compute resources located in the computing environment to identify the set of compute resources as complying with the one or more conditions of the QoS policy.

19. The computer program product of claim 18, wherein the program instructions are further configured to cause the one or more processors to:

collect, by the load balancer, performance information for the compute resources located in the computing environment via interactions with the compute resources; and derive one or more of the KPIs for the compute resources from the performance information for use in identifying the set of compute resources.

20. The computer program product of claim 18, wherein the program instructions are further configured to cause the one or more processors to:

obtain configuration information of the compute resources located in the computing environment from a system resource monitor for the computing environment; and derive one or more of the KPIs for the compute resources from the configuration information for use in identifying the set of compute resources.

* * * * *